T. W. LERCH.
Draft-Attachment for Plows, Cultivators, &c.
No. 196,756.    Patented Nov. 6, 1877.
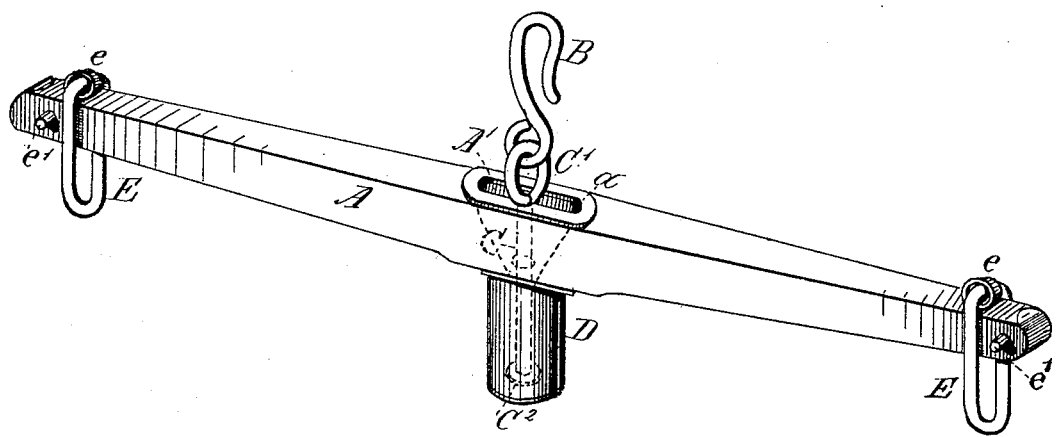
Witnesses.
Henry Orth
H. H. Bliss
Inventor
Thomas W Lerch
by Abbott & Co attys.

UNITED STATES PATENT OFFICE.

THOMAS W. LERCH, OF CANTON, OHIO.

IMPROVEMENT IN DRAFT ATTACHMENTS FOR PLOWS, CULTIVATORS, &c.

Specification forming part of Letters Patent No. 196,756, dated November 6, 1877; application filed August 4, 1877.

*To all whom it may concern:*

Be it known that I, THOMAS W. LERCH, of Canton, in the county of Stark and State of Ohio, have invented certain new and useful Improvements in Draft Attachments; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to a draft attachment for plows, cultivators, and other farming implements and vehicles. It is intended to prevent breakage or other damage that would ordinarily result from coming in contact with obstructions.

This object is accomplished by constructing the draft device so that it shall be capable of yielding at the point where the draft power is applied to the implement or vehicle, and undergo a limited forward movement independently of said implement or vehicle.

My device is so constructed as to insure this yielding, and at the same time permit a considerable lateral play of the draft attachment, without disastrous strain upon the parts.

In the drawing I have shown a perspective view of my improved devices for a draft attachment.

As here shown, my improvements are applied to a whiffletree, A, the general form of which is substantially similar to those in ordinary use. The tree is attached to the implement or vehicle by means of a hook, B, which is permanently connected to the tree by a rod, C, carrying at its rear end an eye or loop, C.

For the reception of the rod C, the tree A is provided at its middle with a triangular slot, A', the apex of said slot opening at the front side of the whiffletree, and the mouth opening at the rear side.

It will be seen that if there should be greater force exerted upon one end of the whiffletree than upon the other, it (the tree) can vibrate to a limited extent upon the rod C without throwing said rod out of the line of draft.

In order to prevent undue wear of the tree by the ring or eye C¹, I place upon the rear face a slotted metal bearing-plate, a.

The rod C carries at its lower or forward a circular head or disk, C², between which the whiffletree is placed the rubber spring D, the rod C passing through the center of the rubber spring. This spring D is preferably cylindrical in form, and of such length as to fit snugly between the tree and head C².

It will be readily seen that by this construction there will always be the same compression exerted upon the spring, from the fact that the binding or cramping of the rod C is prevented, whatever be the relative positions of the rod and whiffletree.

It is manifest that, instead of a rubber spring, a coiled or other spring of metal may be employed to attain the object of this invention.

E is an oblong link employed for the purpose of attaching the single-tree or other tree to the tree which has just been described, in place of the eye, bolt, hook, clevis, or other devices ordinarily used for this purpose.

A bolt passes through the whiffletree, near the end, from front to rear, carrying at its (the bolt's) rear end an eye, e, through which the oblong link E passes, and by which the upper end is held in place. The other end of the link passes around the tree A, and is prevented from slipping therefrom by a pin, e', passing through the tree outside of the link.

By the use of this link the strain arising from the application of draft to the tree A will be more equally distributed through all the fibers than by the devices requiring that the tree should be bored transversely to the line of draft.

I do not wish to be understood as claiming, broadly, the combination of a yielding spring with a draft attachment, as I am aware that that has been before employed; but

What I claim is—

1. The tree A, provided with the slot A', in combination with rod C and spring D, the rod supporting the spring and vibrating in said slot, substantially as set forth.

2. The combination, with rod C and ring C¹, of the tree A, having the slot A', and a bearing-plate surrounding said slot, substantially as set forth.

In testimony that I claim the foregoing as my own I affix my signature in presence of two witnesses.

THOMAS W. LERCH.

Witnesses:
P. S. SOWERS,
GUST. LOTHAMER.